US008890920B2

(12) United States Patent
Heatley et al.

(10) Patent No.: US 8,890,920 B2
(45) Date of Patent: Nov. 18, 2014

(54) MOVING PICTURE COMMUNICATION SYSTEM

(76) Inventors: Richard Piers Heatley, Cambridge (GB); Samuel Thomas Jansen, New Market (GB); Paul Anthony Osborn, Cambridge (GB); Mark Ross Thompson, Cambridge (GB)

( * ) Notice: Subject to any disclaimer, the term of this patent is extended or adjusted under 35 U.S.C. 154(b) by 267 days.

(21) Appl. No.: 13/473,795

(22) Filed: May 17, 2012

(65) Prior Publication Data

US 2012/0300012 A1 Nov. 29, 2012

Related U.S. Application Data

(60) Provisional application No. 61/488,197, filed on May 20, 2011.

(51) Int. Cl.
*H04N 7/14* (2006.01)
(52) U.S. Cl.
CPC ..................................... *H04N 7/142* (2013.01)
USPC ...................................................... 348/14.01
(58) Field of Classification Search
USPC ................ 348/14.01–14.16; 370/260, 352
See application file for complete search history.

(56) References Cited

U.S. PATENT DOCUMENTS

| 7,664,057 | B1 * | 2/2010 | Wu et al. ........................ 370/260 |
| 2005/0162507 | A1 * | 7/2005 | Du ............................. 348/14.01 |
| 2008/0104427 | A1 * | 5/2008 | Yee et al. ....................... 713/300 |
| 2008/0168283 | A1 * | 7/2008 | Penning ......................... 713/310 |

* cited by examiner

*Primary Examiner* — Stella Woo
(74) *Attorney, Agent, or Firm* — Occhiuti & Rohlicek LLP

(57) ABSTRACT

A moving picture communication system 100 for connection to a communications network 22 comprising a telephone device 102 and a moving picture data processor 106. The telephone device 102 is configured to: make voice telephone calls, receive and/or transmit compressed moving picture data via the communications network 22, and input and/or output compressed moving picture data via a port 104. The moving picture data processor 106 comprises a port for inputting compressed moving picture data from and/or outputting compressed moving picture data to the telephone device's port 104. The moving picture data processor 106 is configured to decompress compressed moving picture data from the telephone device's port 104 and/or compress decompressed moving picture data from a moving picture source. The moving picture data processor 106 is controlled, at least in part, by the telephone device 102.

15 Claims, 7 Drawing Sheets

MOVING PICTURE COMMUNICATION SYSTEM

CROSS-REFERENCE TO RELATED APPLICATIONS

This application claims priority to U.S. patent application Ser. No. 61/488,197, titled "A MOVING PICTURE COMMUNICATION SYSTEM", filed on May 20, 2011, the contents of which are incorporated herein by reference.

This application is also related to U.S. patent application Ser. No. 61/488,203, titled "A MESSAGE STORAGE DEVICE AND A MOVING IMAGE MESSAGE PROCESSOR" filed on May 20, 2011, the contents of which are incorporated herein by reference.

BACKGROUND OF THE INVENTION

The present invention relates to a moving picture communication system, a communications method, a telephone device and a moving picture data processor.

Examples of the present invention relate to a device for providing video related features or video phone features to an Internet Protocol (IP) enabled voice telephone. In particular, the telephone may provide the usual voice-only telephony features (for example call set-up, voice media capture encoding and transport) without the presence of the device and the device may be incapable of connection to a voice and video network without the aid of the call set-up and media transport facilities of the telephone. Examples described include a system for providing video related features to an IP enabled telephony device using a hardware video adjunct and the video adjunct is housed in a separate housing to the telephone device. Examples of the present invention are used in a fixed line telecommunications system and particularly for desk-top applications for large organisations or enterprises, such as large companies or government departments, with 5,000 or more people.

There are three general types of known systems for providing fixed line video telephony for large organisations. These include: (1) "all-in-one" personal videoconferencing telephones, such as the Tandberg T150; (2) videoconferencing room systems, such as the Tandberg Telepresence T3; and (3) software plug-ins for general-purpose computers connected to voice-only telephones, such as the Cisco VT Advantage. These are all described, in turn, below.

An example "all-in-one" personal videoconferencing telephone 10 or video IP telephone is shown in FIG. 1. It is a standalone video telephone where the video and audio components are held within the same device sharing the same screen for video display and user interface. In appearance, the telephone is similar to a normal desktop telephone for voice-only calls. It includes a base unit 12 having a keypad 14 for entering phone numbers and for activating other features of the telephone, such as call transfer. Connected to the base unit is a handset 16 with a speaker and microphone. The base unit also has a screen 18 for displaying information, such as the number being dialled on the keypad. When used for video-conferencing, the screen displays an image of the person being called. Typically, the screen has a small area which is shared between the videoconferencing display function and the user interface. The base unit has a video camera 20 for taking video images of the person using the videoconferencing telephone to make a video call. The videoconferencing telephone of FIG. 1 is connected to a network 22 that carries call set-up, voice and video traffic. The small screen is typically too small for multi-party videoconferences and the user-interface is cluttered because of needing elements both for basic voice-call control as well as additional user interface elements to control a video call. Furthermore, as the telephone is usually positioned on a desk-top, the positioning of the camera on the base unit limits the angle at which video can be taken. Generally, this means that video is taken looking upwardly at the person on the telephone, which leads to an unflattering "up-the-nose" video image.

The telephone 10 of this arrangement requires sufficient power to compress video. For high definition video, in particular, this requires high-power processors, which cannot be adequately powered using power-over-Ethernet. Therefore, telephones of this type are powered from the mains and are inoperable both for voice and video calls during a power cut unless an uninterruptable power supply is used.

Another effect of the high power required to compress video (and high definition video in particular) is high heat dissipation. A small surface area desktop-telephone type device such as this is not very effective at dissipating heat. A fan may be required to aid heat dissipation and these are a source of noise.

The telephone may include a video output (not shown), such as a high definition media interface (HDMI) output, for outputting uncompressed video data to display on a separate monitor connected to the output.

An example videoconferencing room system 28 is illustrated in FIG. 2. It is linked with a voice-only IP telephone 38. They are linked together by call-control components within a network to provide a limited level of integration. The videoconferencing room includes a large, typically wall-mounted, monitor 30 and a video camera 32 both connected to a control unit 34. The control unit is connected to the network 22 that carries call set-up, voice and video traffic. The videoconferencing room system has a remote control user interface 36 (similar to a television remote control) or a keypad on a meeting room desk. This is an unfamiliar user interface for making telephone calls to an average user. In this example, to improve the user experience, a regular IP telephone 38 for making voice-only calls is provided in the videoconferencing room. A voice-only call may be made on the regular IP telephone and then that call may be handed over to the videoconferencing room system. However, this leads to ambiguity and thus confusion about subsequently controlling the call. For example, whether the call is under the control of the telephone or the videoconferencing room system, how to make changes to the call, such as adding participants, or which device's user interface should be used.

FIG. 3 illustrates a video telephony system 50 that uses software on a general purpose computer 52 to provide videoconferencing facilities to a regular IP telephone 53 to which the computer is attached. The general purpose computer provides limited video functionality to the telephone at the expense of the computer's facilities for other applications. Connected to the computer are a display 54, a video camera or webcam 56 and a keyboard 58. The computer is connect to the IP telephone by a connection 60 that provides general network traffic, webcam device control and video media traffic. The IP telephone is connected to the network 22 by connection 62 that carries general network traffic as well as call set-up, video and voice media traffic.

With this arrangement, a call is made on the telephone 53 and if videoconferencing is possible by both parties to the call, then the computer 52 is instructed by the telephone to start the webcam 56 and the display 54, and to compress and decompress video for videoconference call.

This is a complex solution as it requires that the computer has certain minimum specification and software and/or operating system compatibility constraints. These constraints can cause conflict between the needs of the staff deploying general applications on the computer and the needs of the staff deploying telephony. It also takes up processing resources of the computer for the duration of the videoconference. Also, the non-real-time nature of general-purpose operating systems tends to make the performance of these hybrid systems worse than the dedicated devices described above.

However, this arrangement provides a partial solution to the user interface problem of the videoconferencing room system 28 of FIG. 2 as prospective users are generally familiar with using computers.

BRIEF SUMMARY OF THE INVENTION

Generally, examples of the invention provide a video adjunct component which may be attached to an Internet Protocol audio telephone to provide videoconferencing features. The adjunct may be attached to the telephone using a direct connection. This connection is independent of the connection from the telephone to the voice and video network. It is a point-to-point link that may be implemented using a variety of means such as universal serial bus (USB), a dedicated Ethernet connection, wireless technology such as ultra-wideband, or some other proprietary wired or wireless protocol. The connection may also be a point-to-point connection tunnelled through the network.

Examples of the invention provide a user with the ability to make a video-call using a familiar interface, namely a regular-looking desktop telephone. This makes making video calls a more reliable and effective experience.

Examples of the invention provide a good angle to video participants in a video call to provide more flattering images. This improves a user's experience of the video conference facility. Again, this makes making video calls a more effective experience.

Examples of the invention use a low-power telephone that may be powered by a network connection, such as an Ethernet connection only. The power required by the telephone may be around 15 W or less.

Examples of the invention include a video adjunct with a large surface area in the form of a display, which aids cooling. By separating the video processing components into the video adjunct, the problem of heat dissipation is moved from the small IP telephone platform to a device with a much larger surface area and better-suited position for active cooling techniques.

The invention in its various aspects is defined in the independent claims below to which reference should now be made. Advantageous features are set forth in the dependent claims.

Arrangements are described in more detail below and take the form of a moving picture communication system for connection to a communications network comprising a telephone device and a moving picture data processor. The telephone device is configured to: make voice telephone calls, receive and/or transmit compressed moving picture data via the communications network, and input and/or output compressed moving picture data via a port. The moving picture data processor comprises a port for inputting compressed moving picture data from and/or outputting compressed moving picture data to the telephone device's port. The moving picture data processor is configured to decompress compressed moving picture data from the telephone device's port and/or compress decompressed moving picture data from a moving picture source. The moving picture data processor is controlled, at least in part, by the telephone device.

In an aspect of the present invention, there is provided a moving picture communication system comprising: a telephone device for connection to a communications network, the telephone device being configured to: make voice telephone calls, receive and/or transmit compressed moving picture data via the communications network, and input and/or output compressed moving picture data via a port; and a moving picture data processor comprising a port for inputting compressed moving picture data from and/or outputting compressed moving picture data to the telephone device's port, wherein the moving picture data processor is configured to decompress compressed moving picture data from the telephone device's port and/or compress decompressed moving picture data from a moving picture source, wherein the moving picture data processor is controlled, at least in part, by the telephone device.

This arrangement allows a user to use a familiar interface (a telephone device) to make video and voice calls. Furthermore, by separating the telephone device and the moving picture data processor, they can be powered separately. The low power telephone may be powered, for example, by power-over-Ethernet and high power moving picture data processor or video processor that compresses and decompresses video may be powered from the mains. Thus, the telephone device can continue to operate even during a mains power cut, for example. Also, the high power device can also have its own bespoke cooling arrangements.

The decompressed moving picture data may be substantially synchronised with a voice telephone call of the telephone device by signals passing between the telephone device and the moving picture data processor. The synchronisation may be by inserting a delay in the moving picture data and/or voice telephone call.

The moving picture data processor and/or the telephone device may comprise a clock. The telephone device's clock and the moving picture data processor's clock may be substantially synchronised by signals passed between the telephone device and the moving picture data processor.

One of the telephone device or moving picture data processor may be configured to append an indication of current time in signals passed between them. The indication of current time may be used to adjust the other of the telephone device or moving picture data processor's clock. The adjustment of the clock may allow for calculation of inserted delay between the moving picture data and voice telephone call, for example, to allow for consistent delay calculations to be made between the two devices. The telephone device and the moving picture data processor may be configured to send and receive messages from one another to negotiate a reduction in inserted delays. The telephone device and the moving picture data processor may be configured, as a result of the negotiation, to make a substantially equal stepwise reduction in inserted delays. These features allow synchronisation between the moving pictures of the moving picture data processor and the voice of the telephone device, so called, "lip-sync".

The telephone device may be powered via a computer network connection only. The computer network connection may comprise an Ethernet connection. As discussed above, this is because the telephone device may be low powered as high power compression and decompression is carried out by the moving picture data processor. As a result, voice-only calls may be carried out during a mains power cut and the telephone device does not require active cooling.

The moving picture data processor may be configured to be powered by a mains supply.

The moving picture data processor comprises a display. The display may have a corner-to-corner diagonal distance greater than 14 inches (35 cm). Such a large display provides a large surface area and a good shape for effective cooling of the relatively high power moving picture data processor.

The display may be configured to act as a display for a computer.

The moving picture data processor may comprise a moving picture source in the form of a camera.

The moving picture data processor may be configured to provide mixed video comprising video from the moving picture source and/or a computer and/or an external source. The moving picture data processor may be configured to display the mixed video on the display. The moving picture data processor may be configured to include the mixed video in the output compressed video.

The moving picture data processor may be housed in a separate housing to the telephone device. This allows the position of the moving picture data processor to be adjusted separately to the telephone device. In this way, for example, a camera integral with the processor may be positioned to give a good view of a person making a video-call. The camera may be positioned to give a view level with a person's head making a call, in other words, avoiding an unflattering "up-the-nose" view of a person making a call.

The moving picture data processor may be arranged to be controlled by a user, at least in part, from controls of the telephone device.

In another aspect of the present invention, there is provided a communications method comprising: a telephone device making a voice telephone call, receiving and/or transmitting compressed moving picture data via a communications network, and having compressed moving picture data input into and/or output from it via a port; and a moving picture data processor having compressed moving picture data input into it from the telephone device's port and/or outputting compressed moving picture data to the telephone device's port, the moving picture data processor decompressing compressed moving picture data from the telephone device's port and/or compressing decompressed moving picture data from a moving picture source, wherein the communications method further comprises the telephone device controlling, at least in part, the moving picture data processor.

In another aspect of the present invention, there is provided a telephone device for connection to a communications network, the telephone device being configured to: make voice telephone calls, receive and/or transmit compressed moving picture data via the communications network, and input and/or output compressed moving picture data via a port to a moving picture data processor; wherein the telephone device, at least in part, controls the moving picture data processor.

In another aspect of the present invention, there is provided a moving picture data processor comprising a port for inputting compressed moving picture data from and/or outputting compressed moving picture data to a telephone device, wherein the moving picture data processor is configured to decompress compressed moving picture data from the telephone device and/or compress decompressed moving picture data from a moving picture source, wherein the moving picture data processor is controlled, at least in part, by the telephone device.

BRIEF DESCRIPTION OF THE DRAWINGS

The invention will be described in more detail, by way of example, with reference to the accompanying drawings, in which.

DETAILED DESCRIPTION OF THE INVENTION

Embodiments of the invention will now be described with reference to FIGS. 4 to 8.

Figure 4:
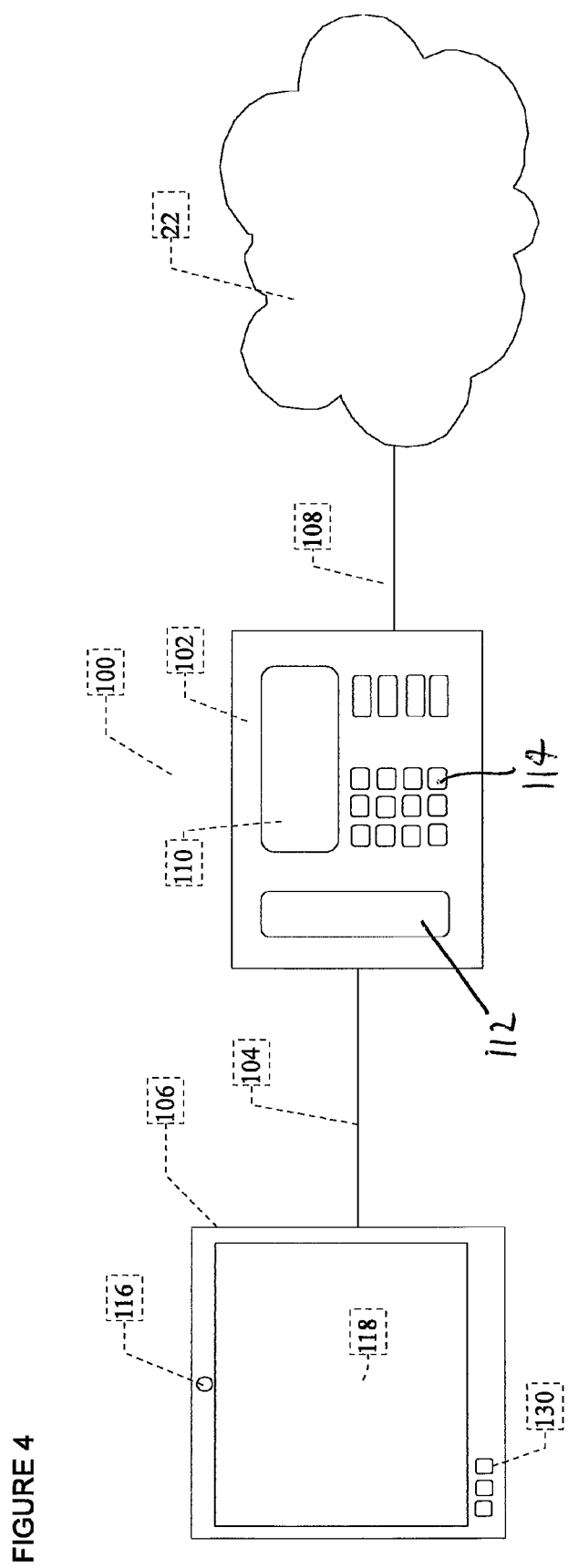
FIG. 4 is a schematic diagram of a moving picture communication system embodying an aspect of the present invention.

FIG. 4 illustrates a communication system 100 that includes a telephone 102 and, in particular, an IP telephone with a casing in communication connection via video connection or interlink port 104 with a separate device, in a separate casing, in the form of a "video adjunct" or moving picture data processor 106, which is described in detail below. In effect, this arrangement provides video resources to a voice-only IP telephone. The video connection between the telephone and the video adjunct is a point-to-point connection that carries device control as well as video and speakerphone media traffic. The telephone is also in communication connection via network connection or port 108 with the communications network 22. The network connection 108 carries call set-up, voice and video media traffic to and from the network 22. It may be connected to the communications network, or voice and video network using any appropriate standard protocol such as H.323, session initiation protocol (SIP), skinny call control protocol (SCCP) or using a proprietary protocol. The telephone includes a user interface 110, such as a touch screen. It also has conventional telephone features such as a handset 112 including a speaker and a microphone and a keypad 114 for entering telephone numbers. The video adjunct includes a moving picture source in the form of a video camera 116. The video camera is mounted above a display 118, such as a liquid crystal display.

Figure 5:
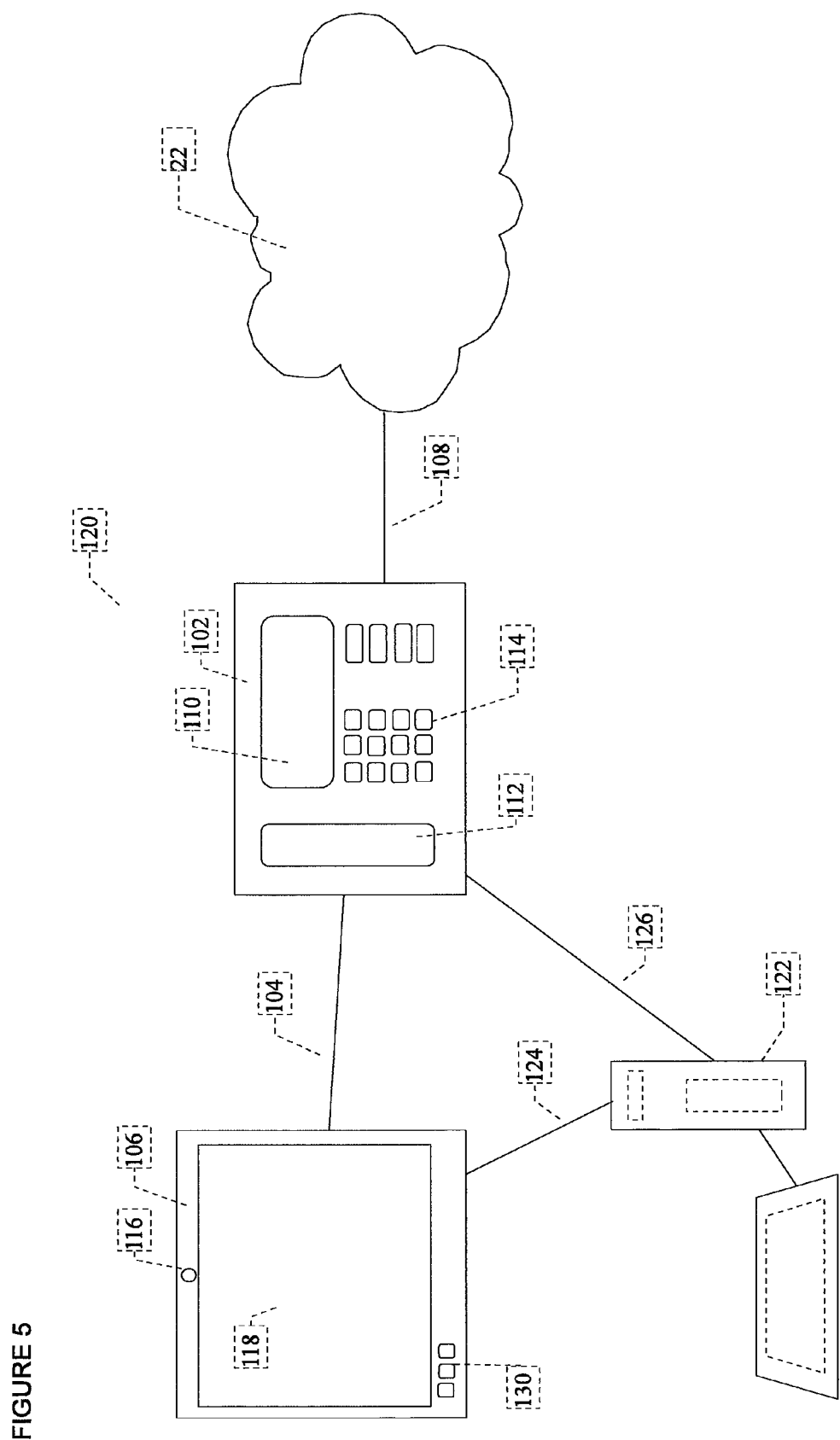
FIG. 5 is a schematic diagram of an alternative moving picture communication system embodying an aspect of the present invention.

The communication system 120 of FIG. 5 is similar to the communications system 100 of FIG. 4 and like features have been given like reference numerals. In this example, the video adjunct 106 is used as a monitor for a computers graphical display as well as for videoconferencing. In other words, in the example of FIG. 5, the video adjunct 106 also acts as a computer display device. The video adjunct is in communication connection with a general purpose computer 122 via connection 124, which in this example is a computer video cable, such as digital video interface (DVI). The computer is in communication connection with telephone 102 via a communication connection or network connection 126. The network connection 126 between the telephone and computer carries general network traffic. The network connection 108 between the telephone and the network 22 carries general network traffic in addition to call set-up, voice and video media traffic to and from the network.

In the examples of FIGS. 4 and 5, the telephone 102 is used as the endpoint of a call and the telephone's user interface 110 is used to control the call regardless of whether it is an audio call, or an audio and video call. The video part of the call (capture/compression/decompression/display) is handled by the separate display device (the "video adjunct" 106). However, the video adjunct is controlled, at least in part, by the telephone. The telephone is a self-contained telephony endpoint which is capable of making and receiving audio calls. The ability of the telephone to have limited video capabilities is not precluded. However, if the video adjunct is connected to the telephone then the full additional video features are enabled in the telephone's user interface and the resources required for full video processing are provided by the video adjunct under the control of the telephone.

The video adjunct may, for example, be built into or integrated with a large screen, for example, a 52" (132 cm) corner-to-corner diagonal distance display which may be mounted on a wall of a meeting room under the control of the telephone (such as illustrated in FIG. 4). Alternatively, the video adjunct may be integrated in a smaller screen, for example a 21" (53 cm) corner-to-corner diagonal distance display which may be on a users desk and shared with the users computer (such as illustrated in FIG. 5). Typically, though, the display has a corner-to-corner diagonal distance of 14 inches (35 cm) or greater.

The video adjunct 106, contains hardware to: (1) display video or moving picture data from a computers display output; (2) receive, decompress and display compressed video from the telephone 102 which has arrived over a network 22 from the far end of a video call; (3) display video captured from a local camera (for example, integral with the adjunct); and (4) a combination of (1) to (3) using overlays (picture-in-picture) (in other words, provide or display mixed video comprising video from a camera and/or a computer and/or an external source).

In addition, the hardware in the video adjunct 106 may be capable of one or more of the following: (1) compressing video from a camera 116 built into the display 118; (2) compressing video captured from the computers display output; (3) sending the compressed video to the telephone 102 for network transmission.

In this example, the video adjunct 106 is primarily controlled by the user interface 110 on the telephone 102. In other words, the video adjunct is controlled, at least in part, from controls of the telephone. In this example, the video adjunct also includes simple controls 130 commonly found on a computer monitor such as a volume control.

If the video adjunct 106 is used as a wall screen in a meeting room then the computer display port could be connected in parallel with a video projector to share slides from a presentation to both local and remote users.

The typical usage of the combination of telephone 102 and video adjunct 106 is to make a video call in exactly the same way that a voice call is made. That is to say, by dialling a number on the keypad 114 of another telephone who it is desired to call and then forming a communication connection between the telephones once the call has been answered. If facilities are available for the call to include video, then video can be added to the call either manually (for example, by pressing a button on the user interface 110) or automatically by policy, the telephone 102 then directs the adjunct 106 to start video capture and display. The telephone's display 110 is then left free for use solely as the user interface for call management.

Once a call is in progress, multiparty conference management may be made by pressing a button or buttons on the telephone's user interface 110. The telephone's user interface may be used to add or remove participants in a conference, control the layout of a multiparty conference, mute or promote participants in the conference.

If the telephone 102 is capable of handling a number look-up for example from a personal directory using an e-mail program integration, or a corporate directory using light-weight directory access protocol (LDAP) or a world wide web look-up mechanism, then this number look-up feature could be used for both voice calls or video calls using the video adjunct 106.

If either the video adjunct 106 or the telephone 102 or both are capable of speakerphone functionality (that is to say, have adequate audio amplification, loudspeaker and microphone to operate as a speaker phone) then the volume control on either the video adjunct or the telephone could be used to control this functionality regardless of which device is performing the speakerphone function.

If the video adjunct 106 is being used for a video call then the telephone's user interface 110 may be used for far-end camera control.

The telephone's user interface 110 may be used for controlling all aspects of the video such as layout of video windows, picture-in-picture, transparency or overlays on the video adjunct 106. It may be used to allow a user to select whether and where and at what size they view themselves and/or any video streams coming from the network 22 via the telephone 102 and/or the computers display output 118, and/or any attached cameras such as document cameras or room cameras.

The telephone's interface 110 may be used to select which video sources are used to send video to the far end of a video call. This may be, for example, a personal camera, a room camera, a document camera, the computers display output or some network supplied video stream.

Media Flows

In summary, the described system includes a telephone device 102 that receives and outputs compressed moving picture or video data. In this example, the telephone device has no functionality to compress or decompress video data. The system has a separate moving picture data processor or video adjunct 106 that compresses and decompresses video data for a video call. The telephone device and the video adjunct are connected together by a direct connection 104 as described above. The processor is under control of the telephone device via control signals, for example to synchronise playing of voice and video data, sent from the telephone device.

In more detail, referring first to FIGS. 4 and 5, the IP telephone 102 is arranged to connect to the IP network 22 and for sending and receiving both call control packets and media packets (voice and image data) via network connection or network port 108 (also shown in FIG. 6), for example, an Ethernet connection. In this example, media packets are transported using real-time transport protocol (RTP). The RTP packets are contained within user datagram protocol (UDP) packets which are held within IP packets. Headers of the media packets (the RTP headers) contain information about the timing and sequencing of the media packets.

The IP telephone 102 is responsible for handling UDP and IP encapsulation for all packets, and for generating and processing RTP packets for audio streams. Video RTP packets are passed to and from the video adjunct 106 via connection 104. The video adjunct is responsible for generating and processing RTP packets for video streams.

In use, the IP telephone 102 inspects passing RTP headers of video packets for generating real-time transport control protocol (RTCP) packets and for audio/video synchronisation (so called lip-sync where movement of a person's speaking lips appearing on a video call are synchronised with the audio of their speech).

Figure 1:
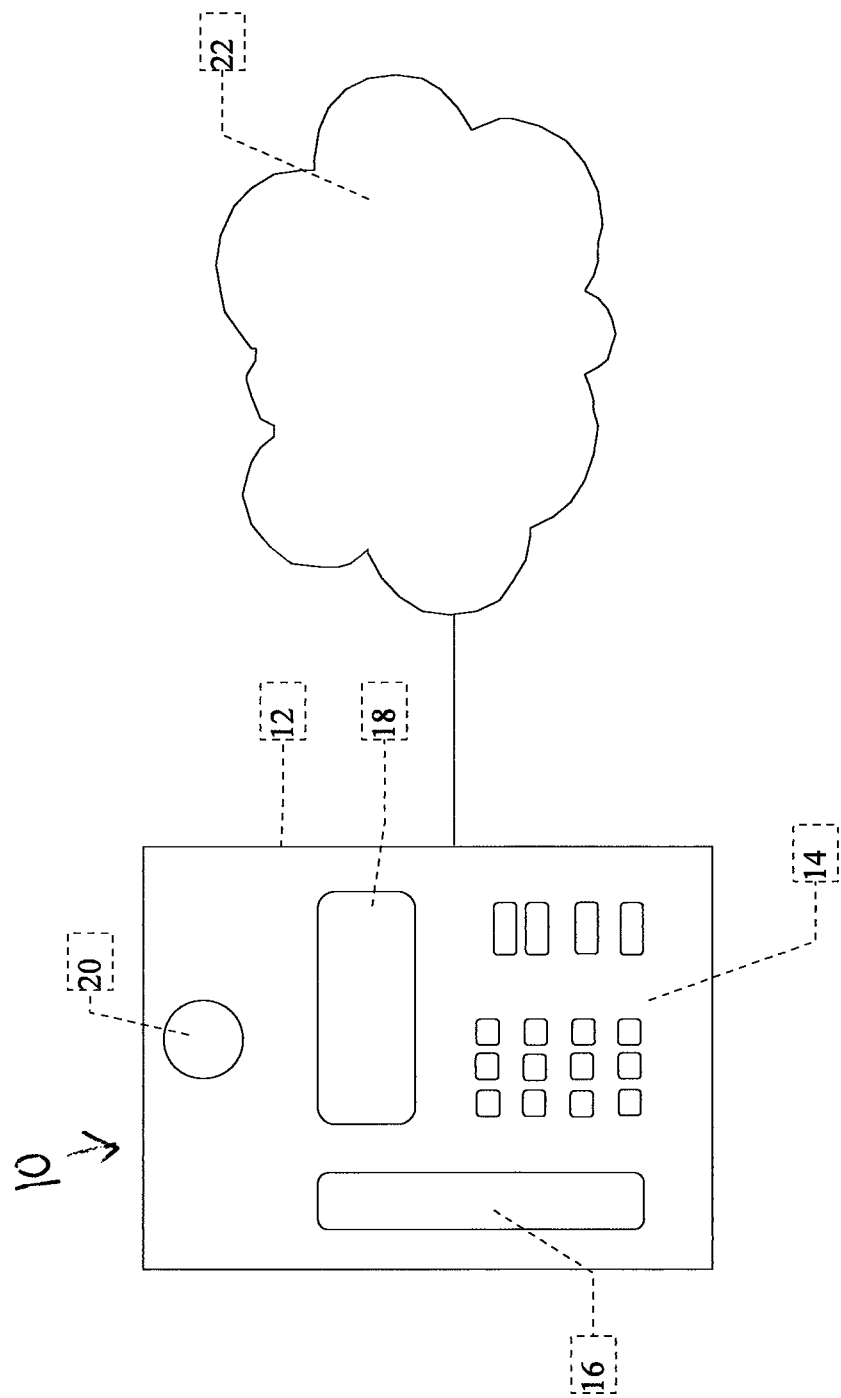
FIGS. 1, 2 and 3 (prior art) are schematic diagrams of known video conferencing systems.
Figure 2:
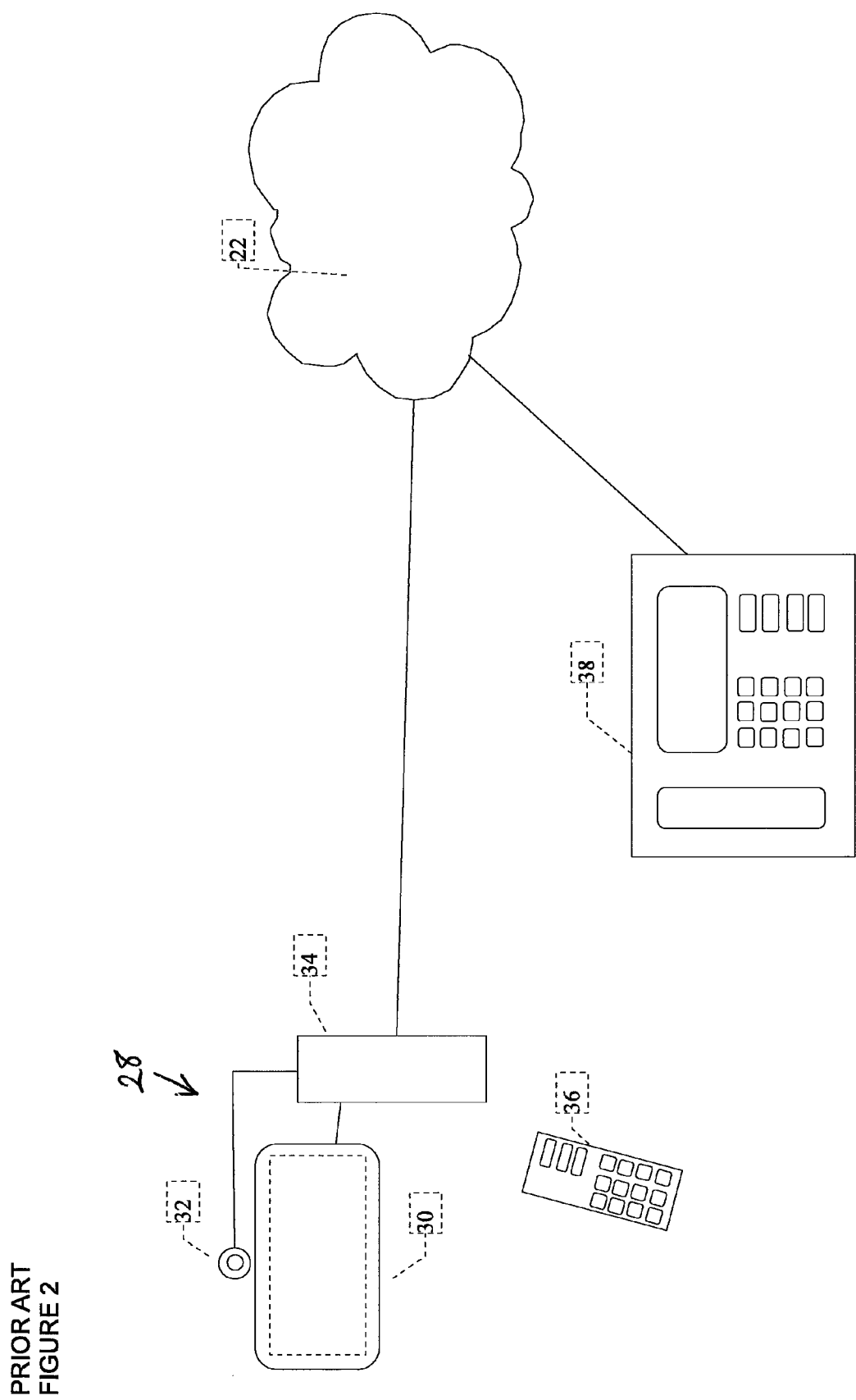
Figure 3:
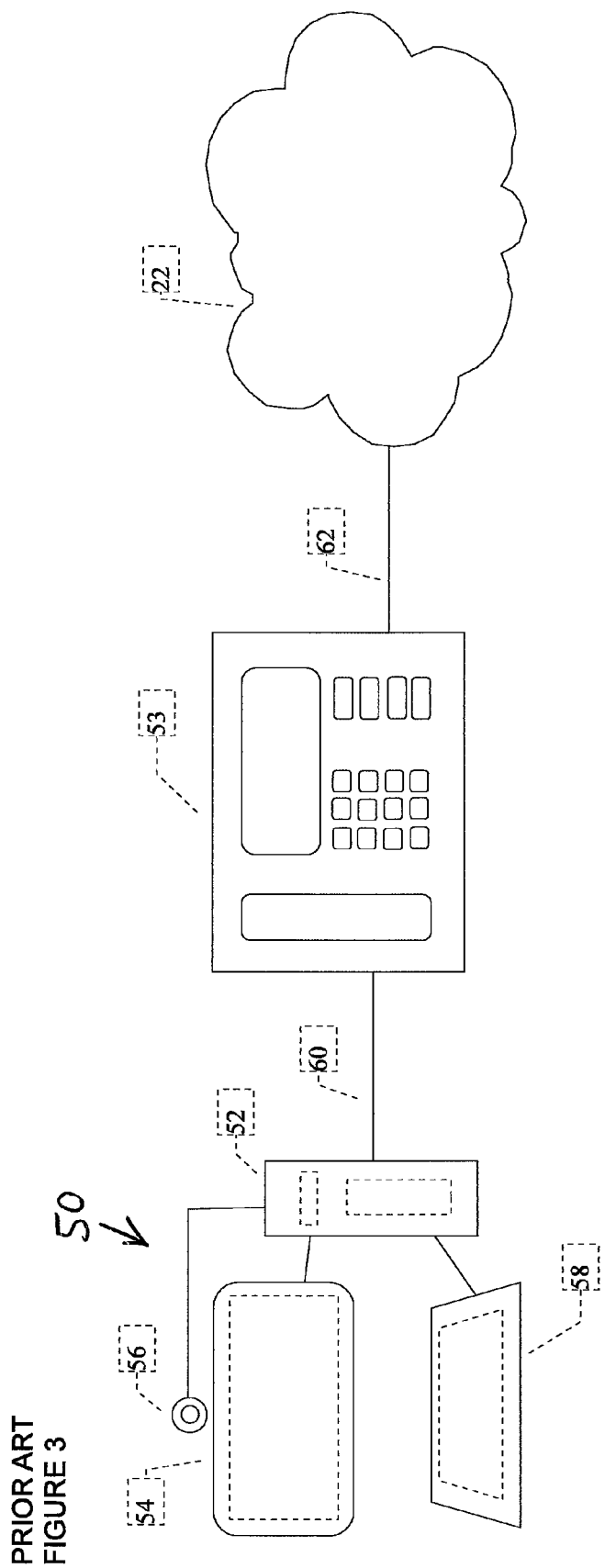

This separation of video traffic, such that compressed video data is handled (compressed and decompressed) by the video adjunct 106 distinguishes this arrangement from the prior art arrangement of FIG. 1 (both as shown and when it includes an additional external monitor, which only receives uncompressed video data).

Figure 6:
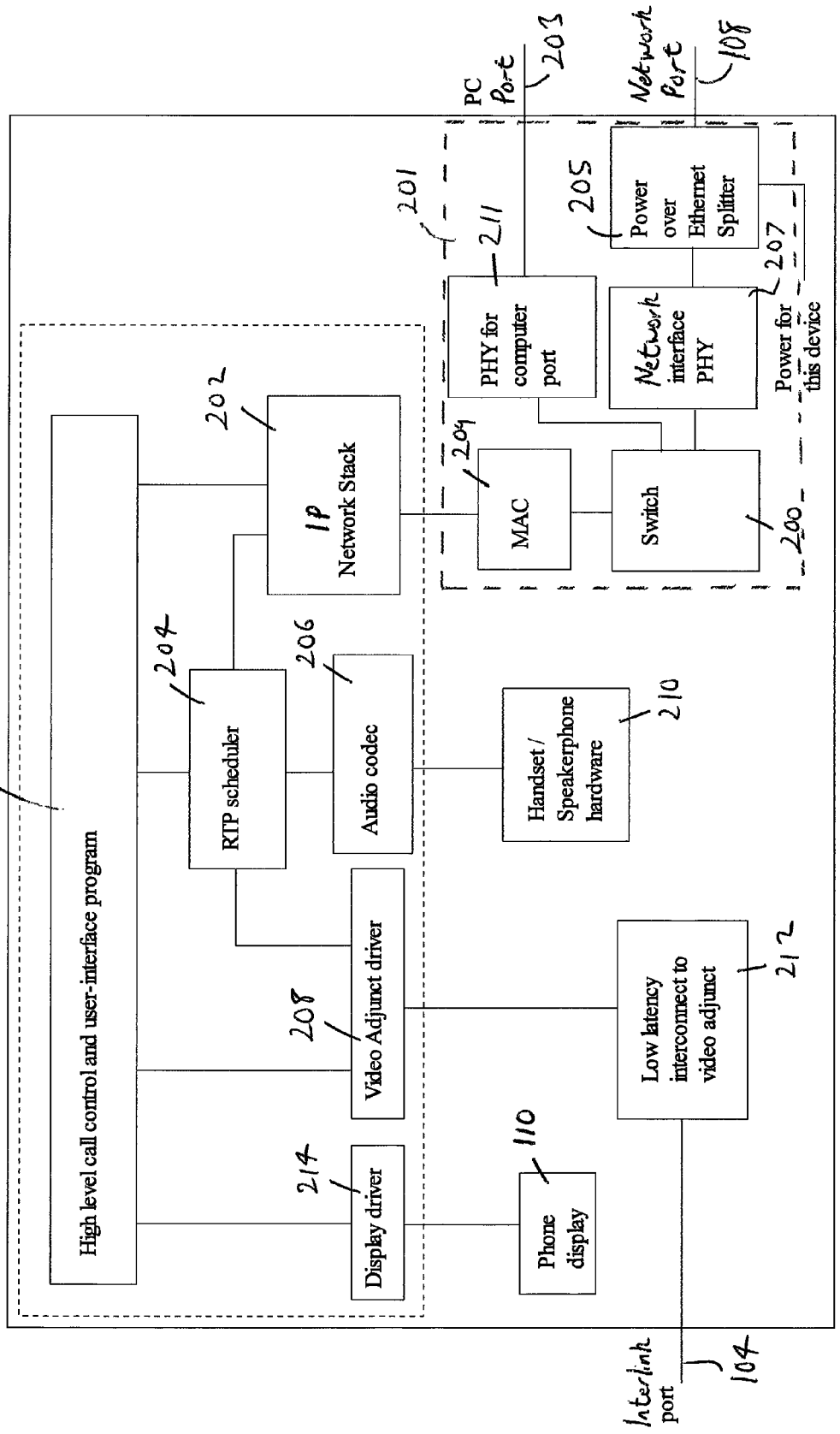
FIG. 6 is a schematic diagram of a telephone device forming part of the moving picture communication system of FIGS. 4 and 5 and embodying an aspect of the present invention.

FIG. 6 illustrates components of the IP telephone or telephone device 102.

The IP telephone includes an interface 201. The interface connects the IP telephone 102 with a communication connection or network port 108 with IP network 22, for example an Ethernet. The interface also connects the IP telephone 102 with a communication connection or PC port 203 with a computer, for example via an Ethernet connection to a PC, so that a computer may by connected to the IP network 22 via the IP telephone (as is usual for desktop voice-only IP telephones).

The IP telephone is connected to the network 22 via a power over Ethernet splitter 205. The splitter extracts power from the Ethernet or communications network to provide power, in this example, all of the power, for the IP telephone. The splitter also allows the Ethernet or network signal to pass through to a physical layer (PHY) 207 that converts from this signal to a digital stream of binary data into the switch 200. The switch is connected to Media Access Control (MAC) element 209 for the IP telephone and to a PHY for the PC connection 211. The switch sends packets to the MAC and/or the PC port PHY depending on to which device the data is addressed (as indicated in the headers of the network packets received). The switch also handles incoming packets input into it from the PC port and the MAC in a similar manner.

MAC 209 is in communication connection with network stack, or IP network stack 202. The network stack is the software and hardware that connects a program (application) to a network. Generally, the network stack is divided into layers with the program or application at the top of the stack and the wire at the bottom of the stack. Each layer in the stack has a particular function. The Ethernet MAC layer is at the bottom of the stack. It handles transmission and reception of packets between devices connected to the same Ethernet network. The IP layer uses the Ethernet MAC layer and enables transmission and reception of packets between devices across multiple networks such as the Internet. The UDP layer uses the IP layer and enables transmission and reception of single data packets between an application on the device on which it is located to an application on another device. The RTP layer uses the UDP layer and enables transfer of relative timing and sequencing information for real-time media data. The RTCP layer also uses the UDP layer and enables statistics to be exchanged between the two ends of an RTP connection, including mapping relative time to "wall-clock" or absolute time and recording numbers of dropped packets detected.

In this example, the stack takes data from the IP telephone and divides it into packets required by the communications network. It also adds, in a header, the sequence number for the packets as well as source, destination and station data as described above. That is to say, it encapsulates RTP packets into UDP packets and encapsulates the UDP packets as IP packets for the IP network (Internet) and encapsulates IP packets into Ethernet packets for transmission by the MAC.

For data received at the IP telephone 102 from the communications network, the stack 202 examines the Ethernet headers to determine the type of packet. For IP packets, it passes them to an IP layer in the stack where the IP header is examined to determine the type of IP packet (for example, UDP). For UDP packets it passes them to a UDP layer in the stack where the UDP header is examined to determine the software component to which the packet is targeted (for example, audio or video). The UDP header is stripped off leaving the payload to be passed to the appropriate software component, in this case an RTP scheduler.

For audio or video packets, the UDP payload data is passed to RTP scheduler 204 where the RTP headers describing the packet are examined to discover timing and sequencing information about the encapsulated media.

An audio codec 206 (encoder/decoder) is in communication with the RTP scheduler 204. The audio codec is in communication connection with the IP telephone's handset/speakerphone hardware 210 in the form of a microphone and loudspeaker. Audio captured by the microphone of the IP telephone 102 is encoded by the audio codec and passed to the RTP scheduler. Audio received via the communications network or Ethernet from the RTP scheduler is decoded by the audio codec and played by the loudspeaker of the IP telephone.

In this way, in summary, audio encoded by the audio codec 206 is passed, via the RTP scheduler 204 where it is encapsulated as RTP packets, to network stack 202 where it is encapsulated as IP packets and onward via MAC 209, switch 200 and the network 104 to the far end of the telephone conversation. Audio from the far end of the telephone conversation is received from network 204 as IP packets, and passed via switch 200 and MAC 209, through network stack 202 where it is decapsulated as RTP packets, via RTP scheduler where it is decapsulated from RTP packets to audio codec 206, where it is decoded and played by the loudspeaker of the IP telephone.

Received audio packets, as IP packets, from the far-end of the telephone conversation, arrive at the IP telephone 102 from the network connection 108. They are passed to switch 200, via network interface or wide area network (WAN) interface 207, through MAC 209 and onward to the network stack 202. The network stack is adapted to recognise audio data (that is to say, distinguish between audio and video data), and when recognised as audio packets based on the UDP port number to which they are addressed, they are decapsulated as RTP packets and passed to the RTP scheduler 204. The scheduler keeps track of arrival times of packets and the associated timestamps and sequence numbers within the packets. The audio payload of the packets are passed to the audio codec to be decoded, decompressed and passed to the appropriate audio playback device 210.

The RTP scheduler 204 is in communication connection with video adjunct driver 208. RTP packets for video are passed to (as recognised by the scheduler based on UDP port number) and sent onwards from the video adjunct driver 208. These packets represent video or moving image data in a compressed form. The RTP packets representing compressed moving image data are transmitted onwards over a low latency interconnection 212 to and from the physically separate or separately housed video adjunct device 106 via connection 104.

High level call control and user-interface program 218 is in communication connection with the video adjunct driver 208, the RTP scheduler 204, and the network stack 202. The high level call control and user-interface program is also in communication connection with display driver 214, which is in communication connection with a display of the IP telephone 110. The high level call control and user-interface program interfaces the keypad 114 and the display 110 of the IP telephone 102 with the video adjunct driver, the RTP scheduler, and the network stack, for example, to append destination information in response to a destination number or phone number being typed into the IP telephone's keypad 114 and to display this number in the telephone's display 110 as it is typed.

Figure 7:
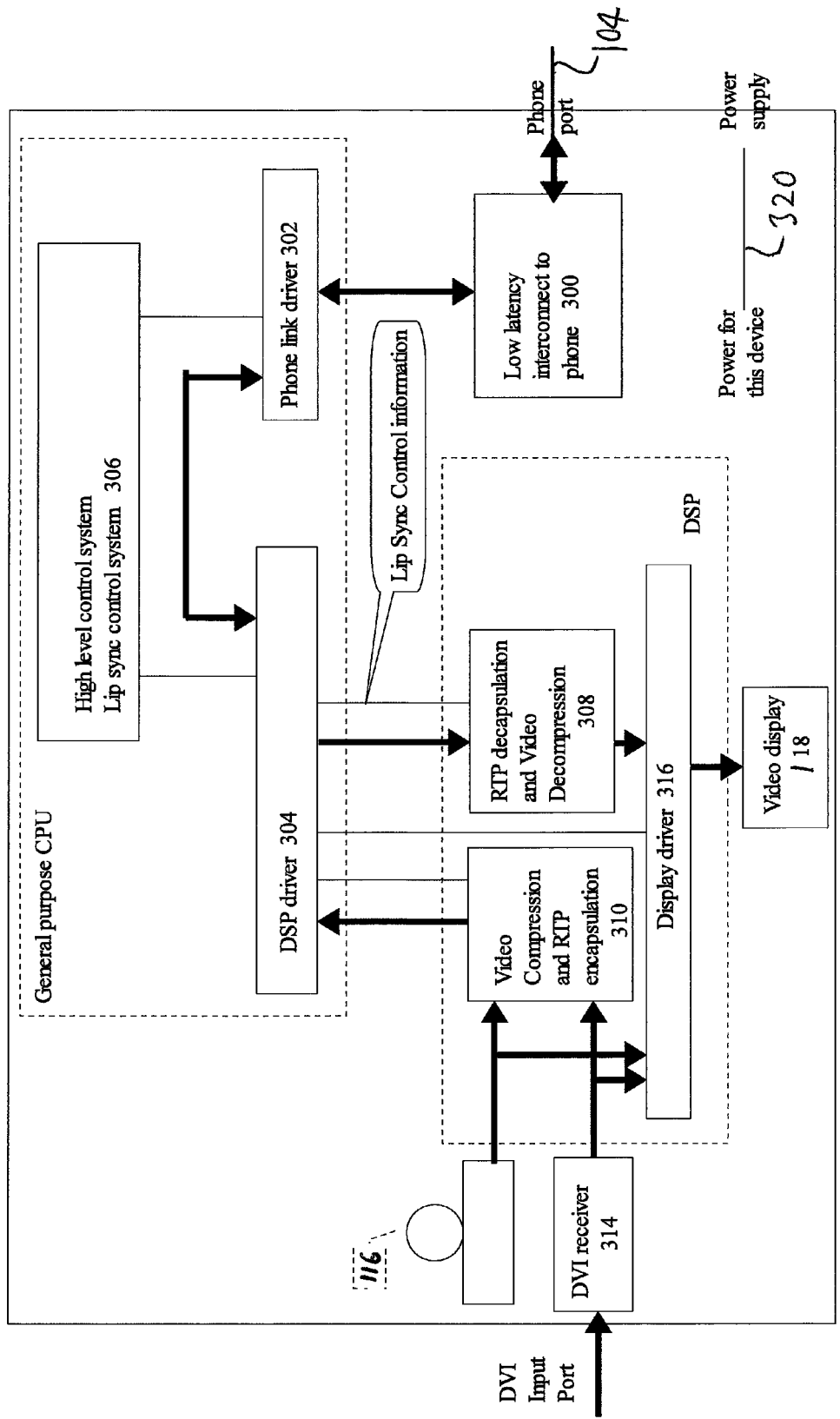
FIG. 7 is a schematic diagram of a moving picture data processor forming part of the moving picture communication system of FIG. 4 and embodying an aspect of the present invention.

FIG. 7 illustrates components of the video adjunct 106 or moving picture data processor. Electrical power for the components of the video adjunct 106 is provided by a mains electricity supply 320.

RTP video packets from the IP telephone 102, that is to say compressed moving picture data, received at the IP telephone, encapsulated as RTP packets, arrive at the video adjunct's phone port 300. The video packets are passed via phone link driver 302 to digital signal processing (DSP) driver 304, via high level control system 306, and on to the RTP decapsulation and video decompression block 308. The RTP video packets are decapsulated and the compressed moving picture data is decompressed by the block 308. The decompressed raw video frames are then passed on, via the display driver 316, to the video display 118 where they are displayed.

Received IP video packets from the far-end of a telephone conversation (including video or moving picture data) arrive at the IP telephone 102 from the network connection 108. They are passed to switch 200, via WAN interface 207, through MAC 209 and onward to the network stack 202. The network stack is adapted to recognise video or moving picture data and, when recognised as video packets based on the UDP port number to which they are addressed, they are decapsulated from IP packets to UDP packets and then to RTP packets, and they are then passed to the RTP scheduler 204. The scheduler 204 keeps track of arrival times of packets and the associated timestamps and sequence numbers within the packets. The RTP packets (carrying compressed video or moving picture data) are then passed on to the video adjunct driver 208 to be passed over a low latency connection 212 to the video adjunct device 106 via connection 104. The compressed moving image data received at the video adjunct is then processed by the video adjunct as described above.

Captured video (raw, uncompressed video or moving picture data) from video camera 116 and/or DVI receiver 314 for a video call is compressed and encapsulated (packetized) as RTP packets by video compression and RTP encapsulation block 310 and passed via the DSP driver 304 and the phone link driver 302 over the low-latency connection 300 and via connection 104 to the IP telephone 102. Spacing or video packet transmission times are applied by applying "back-pressure" (described below) on the low latency link protocol across the phone link driver 302, low latency interconnect to phone 300, low latency interconnect to video adjunct 212 and video adjunct driver 208. The RTP scheduler 204 then passes video packets to the network stack 202 where the RTP packets are encapsulated as UDP packets, which are encapsulated as IP packets to be transmitted to the far end of the telephone conversation.

Back-pressure or pacing of video traffic operates as follows. When an application is using real-time network resources, it is expected to behave in a way which is considerate to other network users. That is to say, keep network use predictable, which is at a consistent and as low a level as possible or in other words avoid bursty transmission (occasional very high bit rate usage). For audio transmission this is usually achieved easily. This is because every audio packet is the same size and they need to be sent at a fixed rate, so the amount of bandwidth the application requires is predictable and uniform. However, for video, this is not the case. Video is typically compressed. A period of compressed video typically starts by sending a key frame (that is to say, a representation of an image that is decodable independently of other frames) which is large in size and follows this by difference frames (that is to say, representations of images that are decodable dependent on other frames) which are much smaller in size than key frames. For example, the video data needing to be sent might start off with a large portion or bit rate of, say, 1 megabit per second at the beginning of the video to transit the key frame then a much smaller portion of, say, 0.1 megabit per second afterwards for the difference frames. However, if the average data usage for the channel is, for example, 0.5 megabit per second, sending data in this fashion is antisocial to other network users because it makes the network less predictable. To avoid this problem, the large portion of 1 megabit per second of video data is chopped up or divided into pieces and transmission of the pieces is paced so as not to exceed 0.5 megabit per second. In other words, transmitted video data is divided into portions such that it is transmitted at a rate below a predetermined data transmission rate.

Audio/Video Synchronisation

As described above, in the communications system 100, 120, audio and video are processed by different devices. The IP telephone 102 processes audio and the video adjunct 106 processes video and, in particular, compresses and decompresses video. There is co-operation between the two devices (the IP telephone and the video adjunct) to manage synchronisation between the audio and video playback, that is to say, lip-sync. In other words, the telephone device manages video traffic. The devices communicate with each other to synchronise themselves. Both the video adjunct 106 and the IP telephone 102 handle media playback scheduling using timestamps received in the RTP stream. The high level control system 306 of the video adjunct includes a lip-sync control system for controlling the video adjunct's role in synchronising with the IP telephone 102. The two devices (IP telephone and video adjunct) maintain synchronisation between their clocks (not shown). This is done by one device (for example, the IP telephone 102) time-stamping all messages which pass over the link 104 from the IP telephone 102 to the video adjunct 106. The other device (in this example, the video adjunct 106) then uses these time-stamps to adjust its clock. The video and audio playback systems (video adjunct and IP telephone respectively) then pass information between each other about the absolute time at which they display a frame or play an audio packet.

In this example, this is achieved by using use the RTCP between the video adjunct 106 and the IP telephone 102. This protocol (RTCP) ties the RTP time-stamp identified in the media packet with the time derived from the devices (IP telephone and video adjunct) synchronised clocks. The RTP scheduler 204 passes information via the link 104 to the lip sync control system 306 indicating the current playback time of the audio. The video decompression code or block 308 passes the playback time of the video to the lip sync control system 306 and onward to the RTP scheduler 204. By comparing the playback time of audio and video it is determined whether "lip-sync" (synchronisation between audio and video) has been established. If not, then the media stream which is ahead (either audio or video) is instructed by the RTP scheduler 204 or the lip sync control system 306 to insert a delay to compensate for the mismatch in playback times.

If the video monitor or video adjunct 106 is showing frames with an RTP time-stamp greater than the RTP time-stamp it receives from the telephone 102 then it may delay the display of frames to synchronise with the telephone's time-stamps. If the video monitor or video adjunct 106 is showing frames with an RTP time-stamp less than the RTP time-stamp it receives from the telephone then the audio playback may be delayed. The two devices (the IP telephone 102 and the video adjunct 106) also send messages to negotiate a reduction in delays if they have both inserted delays to compensate for the other. This is used to minimise the latency of the communications channel.

The above mechanism for inserting delays in media playback to compensate for relative shift in audio and video will over time cause a larger and larger latency to accumulate in the playback paths. This latency will become noticeable by the user and so must be reduced. Two devices (the audio codec 206 of the IP telephone and the video decompression block 308 of the video adjunct) also send messages to report their current inserted delays. The lip sync control system 306 and the RTP scheduler 204 use this information to instruct both the audio and video playback systems to make a gradual and equal reduction in playback delays or a stepwise reduction in inserted delays. The reduction is gradual or stepwise because it requires the video decompression to decompress video data more quickly and there is a limit to the speed at which this is possible on the video DSP 304.

Power Supply

In the example illustrated, the IP telephone 102 is powered from the network connection 108, computer network connection or Ethernet connection to the enterprise network. This allows the power supply to the telephone to be derived from an uninterruptable power source, enabling the telephone to work as a voice-only device even when building power has been lost. The video adjunct 106, however, would typically require significantly more power than is available from a power-over-Ethernet supply. Hence, as described above, the video adjunct derives its power from a local power source or mains power source. The implication of this is that, when an IP telephone is connected to a video adjunct and building power is lost, then the communications system 100, 120 might lose its ability to make video calls but maintain its ability to make voice calls.

Embodiments of the present invention have been described. It will be appreciated that variations and modifications may be made to the described embodiments within the scope of the present invention.

The invention claimed is:

1. A moving picture communication system comprising:
a telephone device for connection to a communications network, the telephone device being configured to: make voice telephone calls, receive and/or transmit compressed moving picture data via the communications network, and input and/or output compressed moving picture data via a port; and
a hardware moving picture data processor comprising a port for inputting compressed moving picture data from and/or outputting compressed moving picture data to the telephone device's port, wherein the hardware moving picture data processor is configured to decompress compressed moving picture data from the telephone device's port and/or compress decompressed moving picture data from a moving picture source, wherein the moving picture data processor is controlled, at least in part, by the telephone device; and
wherein the moving picture data processor comprises a clock and the telephone device comprises a clock; and
wherein the telephone device's clock and the moving picture data processor's clock are substantially synchronised by signals passed between the telephone device and the moving picture data processor.

2. A moving picture communication system according to claim 1, wherein decompressed moving picture data is substantially synchronised with a voice telephone call of the telephone device by signals passing between the telephone device and the moving picture data processor.

3. A moving picture communication system according to claim 2, wherein the synchronisation is achieved by inserting a delay in the moving picture data and/or voice telephone call.

4. A moving picture communication system according to claim 3, wherein the telephone device and the moving picture data processor are configured to send and receive messages from one another to negotiate a reduction in inserted delays.

5. A moving picture communication system according to claim 4, wherein the telephone device and the moving picture data processor are configured, as a result of the negotiation, to make a substantially equal stepwise reduction in inserted delays.

6. A moving picture communication system according to claim 1, wherein one of the telephone device or moving picture data processor is configured to append an indication of current time in signals passed between them.

7. A moving picture communication system according to claim 6, wherein the indication of current time is used to adjust the other of the telephone device or moving picture data processor's clock.

8. A moving picture communication system according to claim 7, wherein the adjustment of the clock allows for calculation of inserted delay between the moving picture data and voice telephone call.

9. A moving picture communication system according to claim 1, wherein the telephone device is configured to be powered via a computer network connection only.

10. A moving picture communication system according to claim 1, wherein the moving picture data processor is configured to be powered by a mains supply.

11. A moving picture communication system according to claim 1, wherein the moving picture data processor is configured to provide mixed video comprising video from the moving picture source and/or a computer and/or an external source.

12. A moving picture communication system according to claim 11, wherein the moving picture data processor is configured to display the mixed video on the display.

13. A moving picture communication system according to claim 11, wherein the moving picture data processor is configured to include the mixed video in the output compressed video.

14. A moving picture communication system according to claim 1, wherein the moving picture data processor is housed in a separate housing to the telephone device.

15. A moving picture communication system according to claim 1, wherein the moving picture data processor is arranged to be controlled by a user, at least in part, from controls of the telephone device.

* * * * *